United States Patent [19]
Abbondio et al.

[11] 3,890,048
[45] June 17, 1975

[54] METHOD AND APPARATUS FOR MEASURING THE COLOR DENSITY OF PRINTING INKS APPLIED TO A MOVING WEB

[75] Inventors: Antonio Abbondio, Lausanne; Tino Celio, Ambri, both of Switzerland

[73] Assignee: Gretag Aktiengesellschaft, Regensdorf, Switzerland

[22] Filed: Oct. 30, 1972

[21] Appl. No.: 301,722

[30] Foreign Application Priority Data
Nov. 3, 1971 Switzerland.................. 16000/71

[52] U.S. Cl........... 356/199; 356/195; 235/61.11 E; 250/559; 250/226; 101/335
[51] Int. Cl...................... G01n 21/18; G01n 21/20
[58] Field of Search.................. 356/195, 199, 172; 33/184.5; 250/226, 559; 101/233, 202; 235/61.11 E

[56] References Cited
UNITED STATES PATENTS
2,968,988  1/1961  Crosfield.................. 356/195
3,376,426  4/1968  Frommer et al............. 250/226 X

OTHER PUBLICATIONS
Smiel, Color Engineering, Vol. 4, No. 2, 1966, pp. 31–34.
Bosse et al., Fogra–Mitteilungen, Nos. 54/55, Dec. 1967, pp. 26–35.
Anon., Druck/Print, Vol. 7, July 1971, pp. 469–471.

*Primary Examiner*—Robert J. Webster
*Attorney, Agent, or Firm*—Pierce, Scheffler & Parker

[57] ABSTRACT

A method and apparatus is provided for measuring the color density of printing inks applied to a moving web of paper to form multi-colored printed pages. The color density of the inks is measured from a test colorimetric scale specially printed on the paper either outside or between the edges of the pages. The test scale comprises a plurality of color zones, one each for the different color inks being used, each zone having three different tones of the zone color, a reference white zone and two groups of synchronising marks. The apparatus is adapted to detect the synchronising marks and produce timing pulses which are applied to a programmer controlling the sensing of the density values of each of the tones in the zones as the scales pass by a reading head. Light from the reading head is focussed onto the scales the reflected light being received by a photo-detector which produces signals and passes them on to an evaluation circuit which determines the color density value of each of the tones of a zone against the reference white value, the evaluation being synchronised with the movement of the paper by means of the programmer.

9 Claims, 5 Drawing Figures

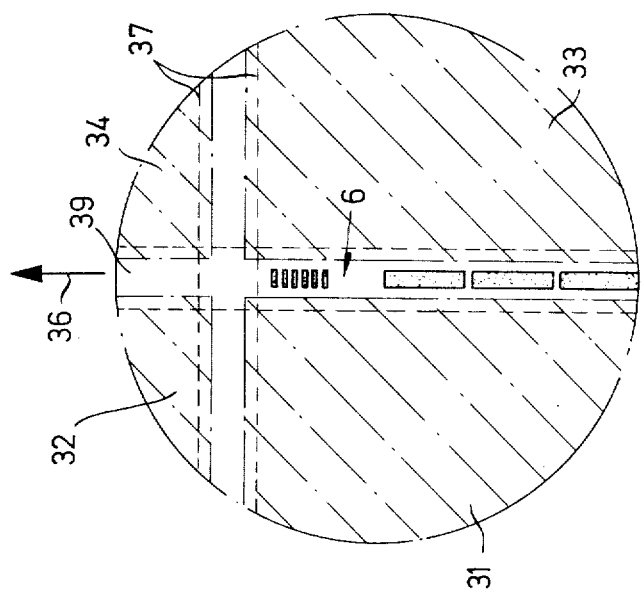
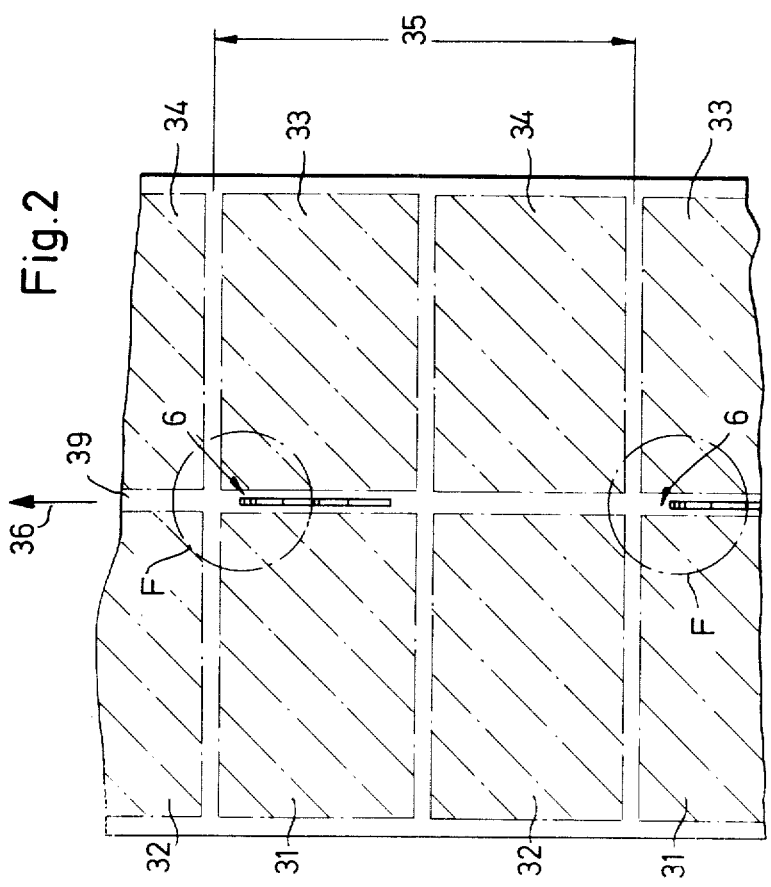

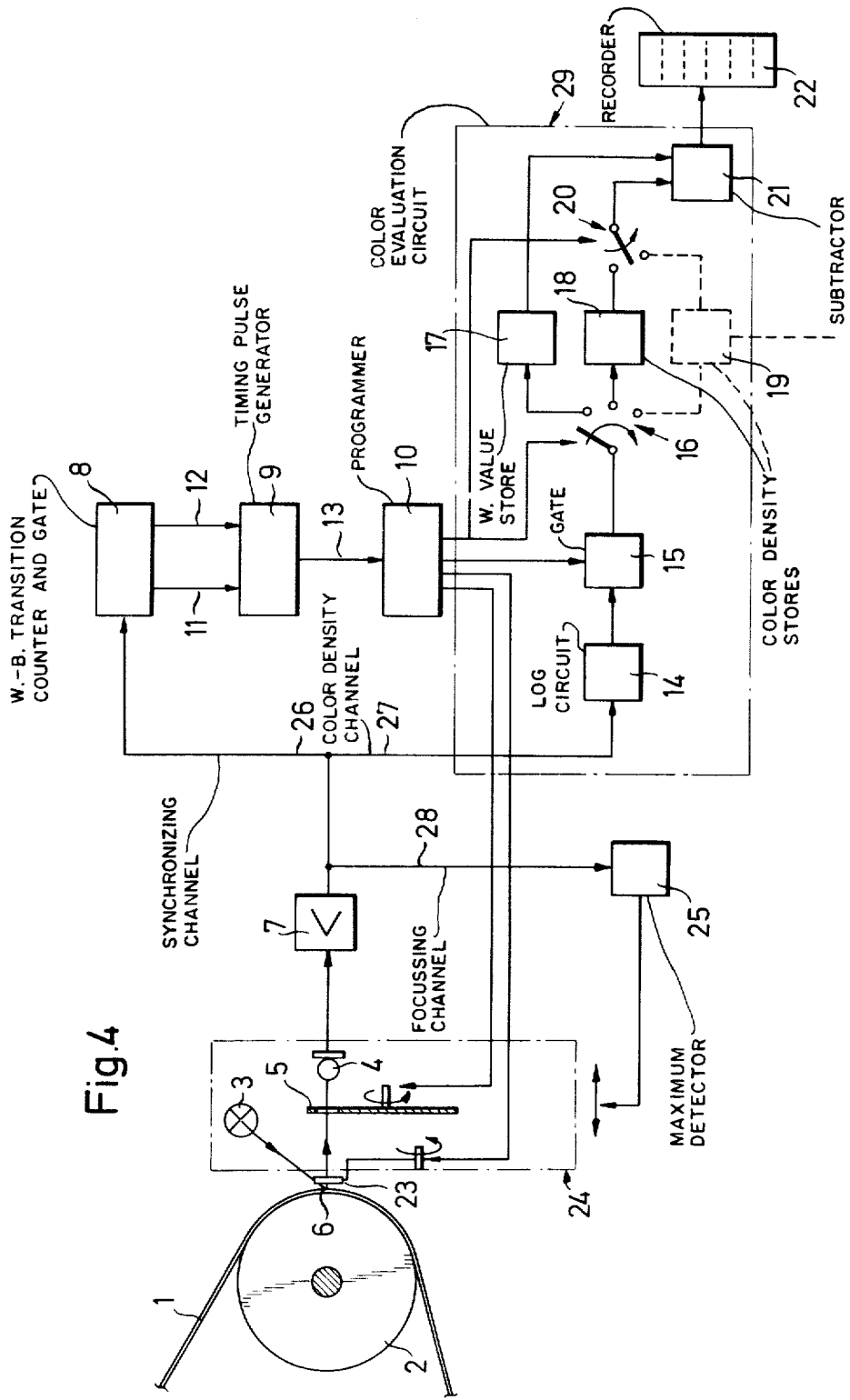

METHOD AND APPARATUS FOR MEASURING
THE COLOR DENSITY OF PRINTING INKS
APPLIED TO A MOVING WEB

FIELD OF THE INVENTION

This invention relates to a method and apparatus for measuring the color density of printing inks applied to a moving web of material in, for example, multicolor photogravure.

PRIOR ART

Color density is one of the most important factors in printing, and must therefore be continuously monitored and supervised. In practice, the color density is usually supervised off-line, i.e., independently of the printing operation by measuring the colour on the printed sheets with special instruments away from the printing machine. Since the densitometers used for this purpose are operated manually or semi-automatically, this method of operation is very time-consuming and measurement must be confined to random samples.

The method of this invention provides for a test print to be specially printed on the moving web at the same time as the printed text, the test print then being evaluated for color density by electro-optical means as the web continues to move.

In a known method of this type, each impression cylinder of a printing machine prints different colored spots, each of medium tone on a paper sheet or web, the spots being printed together as close as possible on the sheet or web and disposed on a line extending in the direction of sheet or web movement. The color spots are illuminated by a light source on the printing machine and the light reflected by the color spots is received by a photoelectric cell which provides a signal for evaluation. To ensure the correct association between the output signals from the photoelectric cell and the color spots, a rotating diaphragm fitted with color filters is disposed between the spots and the photoelectric cell, the rotation of the diaphragm being synchronised with the rotation of the impression cylinders.

With this known method, the test print contains only a single tone value per color, and this value is used for evaluation purposes together with the paper white of the printed sheet. To ensure adequate conformity between the original and the print with this method, there would have to be a straight line relationship between the density of each color spot and the density of paper white. This is usually not the case, however, so that this method does not give adequate conformity between the original and the print. Another disadvantage of this method is that a relatively expensive supplementary device is required on the printing machine in order to synchronise the measurement with the printing cycle, i.e., the speed and phase of the printing plate.

THE INVENTION

The invention obviates these disadvantages by providing a test print having a colorimetric scale which is oriented in the direction of web movement and which includes a measuring zone for paper white and individual color measuring zones, each zone comprising at least three color tones, synchronisation markers being provided for determining the position of the measuring zones as the test print passes through an evaluation system.

The invention also relates to apparatus for performing this method comprising a measuring head for scanning the colorimetric scale printed on the paper web, the head including at least one illuminating light source and a photo-detector, a color evaluation circuit which is connected to the output of the measuring head for evaluating the color information of at least three colorimetric zones per color, a synchronisation circuit connected to the output of the measuring head to sense the synchronisation markers and produce basic timing pulses of a repetition frequency corresponding to the paper web speed, and a programmer which is connected to the synchronisation circuit output to control the individual operational steps of the measuring head and of the color evaluation circuit in synchronism with the basic timing pulses.

The measurement of three different color tones for each color and subsequent correction of the respective color separations by means of these measurements enables good relation between the original and the printed copy to be obtained even if the color density of the original is non-linear. To avoid wasting paper, the test print may be printed outside the printed-page areas on the web, preferably the test print is so narrow as to be printable in the fold between the printed-page areas. It is also possible to extend the colorimetric scale by using more than three colorimetric zones for use in special operating conditions such as in litho.

The use of synchronisation markers in the test print eliminates any error in associating the individual measured values with the colorimetric zones of the colorimetric scale, even if the passage of the test print through the measuring head does not coincide with the printing cycle. This method is therefore applicable not only to rotary processes but also to sheet-fed printing.

It will be apparent that for measuring the transverse homogeneity of color density, particularly in offset printing, it is possible to dispose a plurality of test prints over the width of the web in parallel relationship to one another, for example one at each edge and one in the middle of the web.

In a preferred embodiment to be described in detail hereinafter, the color density may be related not only to the paper white of the associated measuring zone, but also to a predetermined reference white.

A preferred form of apparatus for performing the above method contains a control device for automatically focusing the optical part of the measuring head on to the test print.

BRIEF DESCRIPTION OF THE DRAWINGS

In order that the invention may be fully understood a preferred embodiment thereof will now be described with reference to the accompanying drawings in which:

FIG. 2 shows a web having printed pages thereon and between the pages a test print as shown in FIG. 1;

FIG. 3 is an enlarged detail of FIG. 2;

FIG. 4 is a block schematic diagram of a preferred form of apparatus for performing the method.

DETAILED DESCRIPTION OF THE PREFERRED EMBODIMENT

In the method according to the invention a test print is printed at the same time as the printed text and contains information for determining color density and for determining the speed of the paper web. This information is obtained by scanning the test print and on-line electronically processing the signals provided by scanning. The color density information gives a clear indication whether the individual colors of the matter printed on the sheets shown in FIG. 2 which are printed at the same time and with the same color as the corresponding color measuring zones of the test print are within predetermined and/or admissible tolerances.

Figure 1:
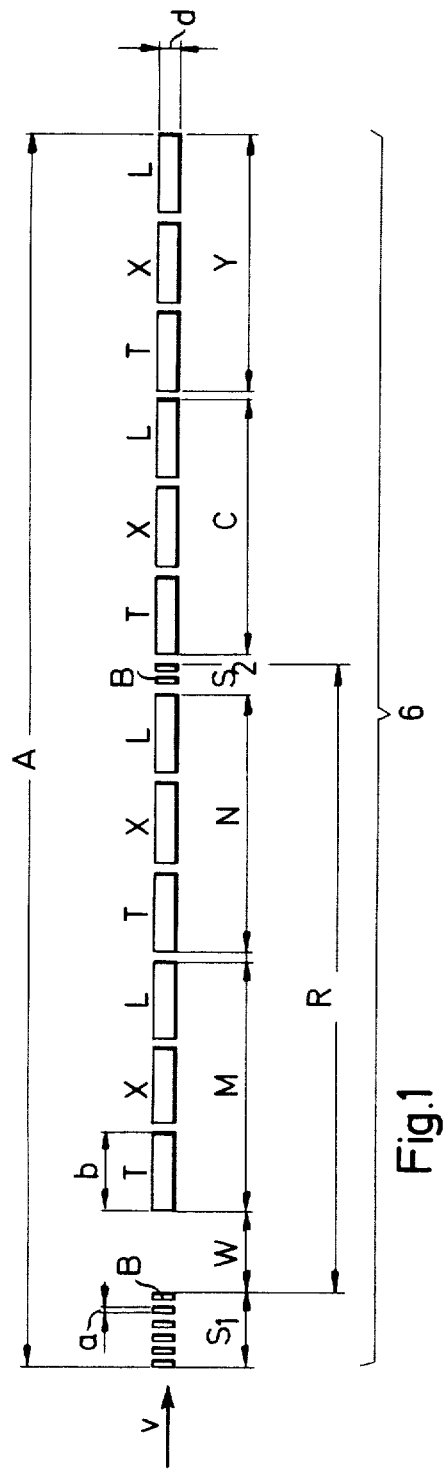
FIG. 1 shows a test print used in a method in accordance with the invention.

Referring to FIG. 1, the test print 6 which is printed together with the text includes color measuring zones T, X, L and synchronising markers B. The total length A of the test print is smaller than the maximum length of the printed-page measured in the direction of movement of the paper web. In the case of rotogravure, the length A is roughly equivalent to one-quarter of the circumference of the impression cylinder, and is 150 mm, for example, in the case of a cylinder circumference of 760 mm. The width d of the test print must be small enough to enable it to be placed either at the sides or in the middle of the web so that the test print appears outside the edges of the pages or between pages so that in the latter position it is hidden by the fold. A test print width of 3 mm has proved very satisfactory in practice.

The test print 6 contains colorimetric zones for the four complementary colors cyan (C), magenta (M), yellow (Y) and black (N). There are at least three color tone zones associated with each colour and as shown in FIG. 1 these are a deep tone zone (T), a medium tone zone (X) and a light tone zone (L). The colour tone zones of length b are also known as colorimetric bars. Three color tones is regarded as a minimum requirement for determining the printing operations in rotogravure. This number can, of course, be extended, however, by the incorporation of additional intermediate tones, depending upon the requirements and properties of the type of printing used. The various colour tone zones are so arranged that the color density in the zones decreases in the printing direction V. The different color tones are disposed in the same sequence as they are printed on the paper. The paper white zone W located at the beginning of the color zones may be used as a reference zone against which the color density is measured.

Synchronisation markers B, from which the printing rate or speed of transport of the paper web is determined, are divided up into two groups S1 and S2. Each group contains a number of markers so that the test print can be clearly distinguished from the information on the printed-pages. Since there may be other control marks, dirt, mounting mistakes, etc., in the strips between the pages making it difficult for the markers to be read without error six and two bars of a width a (for example a = 1 mm) are used for the two groups of markers S1 and S2 respectively. The distance between the last bars of the two groups S1 and S2 is referred to as the synchronisation length R. This length is known beforehand and is, for example, 100 mm. The speed of the paper web can thus be easily calculated from the difference in time between the passage of the groups of markers S1 and S2. To ensure separation of the synchronisation markers and of the colorimetric bars, the following applies:

$$b/a \geq V\,max/V\,min,$$

where $a$ and $b$ are the lengths of an individual synchronisation marker and of a colorimetric zone respectively and $V$ max and $V$ min are the maximum and the minimum paper web speed respectively within which color density measurement is required to be carried out. A typical value is $V\,max/V\,min = 6$.

Referring to FIGS. 2 and 3, in which FIG. 3 is an enlarged view of the zone F in FIG. 2, the web contains four printed pages 31, 32, 33 and 34 per plate over a length 35 corresponding to the circumference of the cylinder. The test print 6 is printed in the space 39 between the left-hand and the right-hand printed pages 31, 32 and 33, 34 respectively. In FIG. 3, the trimming lines 37 for the printed pages 31 to 34 are shown in broken lines, and it will be apparent that the test print 6 in the space 39 will be removed on trimming the printed pages along the longitudinal trimming lines when adjacent pages 31, 33 and 32, 34 are required to be separated.

FIG. 4 shows apparatus for evaluating the information contained in the test print. Referring to FIG. 4, the web of paper 1 bearing the test print 6 travels over a portion of the periphery of a cylinder 2. A light source 3 illuminates the test print 6 and the reflected light impinges on a photo-detector 4. In order to avoid unnecessarily complicating the drawing, the latter does not show the image-forming optical system which projects light from the source 3 onto the strip 6 and images the reflected light on to the photo-detector 4 but such a system will be familiar to those versed in the art. The measuring head 24, which contains the light source 3 and the photo-detector 4, is also provided with a color filter wheel 5, and a reference white transmitter 23.

The signal produced by the photo-detector 4 is amplified in an amplifier 7 and then processed in various ways in a synchronisation channel 26, a color density channel 27 and a focusing channel 28.

Figure 5:
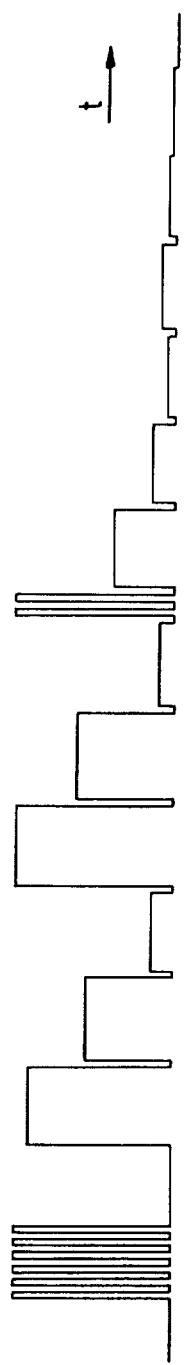
FIG. 5 shows a signal obtained from the apparatus shown in FIG. 4 as the test print shown in FIG. 1 is scanned.

FIG. 5 shows a signal delivered by the amplifier 7 when the filter wheel 5 is in a position at which a green segment is interposed between the strip 6 and the photo-detector 4. In this condition, the following signals occur in chronological sequence: synchronisation signals produced by the markers of group S1, a reference white (W) signal, signals for each of the tones of the magenta (M) colorimetric zone and for the black (N) colorimetric zone which all occur with maximum amplitude, signals produced by the synchronisation markers of the second group (S2), signals for each of the tones of the cyan zone (C) which are subject to the effects of absorption by the green filter, signals for each of the tones of the yellow zone (Y) which are also subject to the effects of absorption by the green filter.

The synchronisation information is obtained from the circuits 8 and 9 (FIG. 4), which operate as follows: When a white to black transition edge is detected, a gate is opened for a predetermined time in the circuit 8, said time corresponding to the passage of the group S1 at the minimum printing speed V min. If at least six white-black transitions are counted within this period in a counter, a signal is delivered over the S1 line 11 and at the same time the circuit 8 is switched to a one-quarter gate opening time and to the counting of two white-black transitions. If two pulses are then counted, i.e., the markers of the group S2 are detected, a pulse is delivered over the S2 line 12 and the circuit 8 is returned to its initial state for detecting the next S1 group. If six or two synchronisation markers respectively are not detected within the predetermined time interval, the circuit is returned to its initial state. The interval of time between the pulse over the S1 line 11 and the pulse over the S2 line 12 is equivalent to the synchronisation interval R (FIG. 1), the length of which is predetermined. By dividing this interval of time into a predetermined number of intervals, for example 200, time markers are obtained which correspond to a definite length of, for example, 0.5 mm on the paper web independently of the speed of the latter. Starting from the group S1, it is possible to identify each colorimetric zone in the scale by counting the time markers. If, for example, the distance between the magenta medium tone zone MX and the end of the synchronisation marker group S1 is 35 mm, it is only necessary to start a counter at the last pulse of the group S1 and count up to 70. The next pulse then indicates the beginning of the magenta medium tone zone.

The time markers are produced in the circuit 9, which is referred to as a basic timing pulse generator. The synchronisation pulses produced by the synchronisation marker groups S1 and S2 are fed to this pulse generator via the S1 line 11 and the S2 line 12. The time markers are then fed via the basic timer line 13 to a programmer 10 in which the position of the various measuring zones on the color measuring scale is stored.

Evaluation of the color information is carried out in the evaluation circuit 29 as follows: The scanned signal amplified by the amplifier 7 is fed via line 27 to a logarithmic circuit 14 which calculates the corresponding color density values from the signals. The element 15 is a gate which is opened by the programmer 10 at the programmed time, for example when the above-mentioned magenta medium tone zone (MX) occurs. The programmer 10 also connects a selector switch 16 to a color density store 18 so that the information passed by the gate 15 is stored therein. The same process is repeated for the various other color measurement zones of the test print. The information relating to these zones is stored in a corresponding number of color density stores 19. The color density value for the white zone in the test print or from the reference white transmitter 23 is stored in a separate white value store 17 and is then subtracted from the contents of the color density stores 18 and 19 in a subtraction network 21. The selector 20 controlled by the programmer 10 is used for this purpose. The detected values representing color density are recorded by a printer 22 or other form of recording device. The measured values of one color measuring zone can be cumulatively stored in the color density value store 19, a mean value obtained and the white value stored in store 17 subtracted from the mean value. If the color density values are not to be referred to the printing web white, then at the required time the programmer 10 can introduce a reference white value from a reference white device 23 into the optical ray path of the measuring head 24. This reference white value is recorded in the store 17 and the color density values can then be subtracted from this white value.

Automatic focusing of the measuring head 24 on to the paper web 1 can be effected as follows:

The scanned paper web signal amplified in the amplifier 7 is fed to a maximum detector 25 via the focusing line 28. Since the amplitude of the electrical signal over the line 28 reaches a maximum value when the head is correctly focussed, the determination of this maximum value in the detector 25 can be used to move the measuring head 24 to ensure that optimum focusing is obtained.

On a preferred form, the dimensions of the test print shown in FIG. 1 are as follows:
A = 195 mm, a = 1 mm, b = 13 mm, d = 3 mm, W = 13 mm R = 100 mm, S1 = 11 mm, S2 = 5 mm.

The following working conditions have proved very advantageous for the evaluating system shown in FIG. 4:

Printing speed limits: 2.5 to 15 metres per second
Illuminating lamp 3: Halogen 50W, 1400 lumens
Photo-detector 4: 931A Photomultiplier
Color filter in wheel 5: Wratten 25, 59, 47
Focusing range: 10 ± 3 mm Evaluation of the color information can be obtained in different ways by using the programmer 10. For example it may be required to obtain five mean values of each color, each mean value being derived from scanning the test strips associated with each of eight consecutive sheets. This is effected by first placing the green filter in the color filter wheel 5 in front of the photo-detector 4. The white value and the three magenta tones only are cumulatively stored during scanning of eight consecutive sheets and their mean value is then printed out as the first line of the measurement record. This process is then repeated five times. A filter having the standard spectral brightness sensitivity characteristic of the human eye is then placed in front of the photo-detector 4, and the white value and the three black tones are cumulatively stored during scanning of the reset eight consecutive sheets. The mean values are then printed out and this process is repeated five times. A Red filter is then placed in front of the photo-detector 4 during scanning of the cyan zones associated with the next eight sheets and then a blue filter is placed in front of the photo-detector 4 during scanning of the yellow zones associated with the next eight sheets, the mean values being printed out and the process repeated five times as before. The printed-out values are color density values.

The measurement record may also contain additional information relating to the measurement conditions. For example, it is possible to indicate whether a mean value measurement MM was carried out, or else it is possible to print out details as to the number P of mean value groups to be printed per color, the number N of sheets per color over which an average is to be taken, the sequence F of the primary color groups M. N, C, Y to be measured, the types of output A for the measurement record (printer D, screen BS, tape, punch tape, the paper web white value WW measured behind the respective measuring filters, the number and type of primary or secondary colors, the number and type of color tones of said primary or secondary colors and the type of printing machine (sheet-fed rotary press) and the printing process (intaglio, letterpress, offset, litho, etc.).

The way in which the measured data is presented is important in practice since the machine operator needs to have mean value measurements over a specific number of sheets, and this data should be in a form such as to enable him very simply to deduce and assess the color conditions occurring.

What is claimed is:

1. A method of measuring the color density of printing inks applied to a moving web of material to print multi-colored matter thereon, the method comprising;
   a. printing on said web in the direction of movement thereof a plurality of colorimetric scales, each scale having a plurality of different colored zones, and each zone comprising at least three different tones of the zone color arranged in sequence on said web in the direction of web movement, a first group of synchronizing marks at one end of each said scale and a second group of synchronizing marks between zones of a scale each mark being printed in a direction transverse to the direction of web movement,
   b. sensing the synchronizing marks and providing in response thereto a plurality of timing pulses each representing an incremental movement of said web, the distance between said first and second groups determining the synchronization between web travel and sensing of each of the tones in a zone,
   c. sensing the color density of each tone in a zone in response to a timing pulse indicating that the zone is in a position to be sensed,
   d. providing a white reference, and
   e. evaluating the density of each tone of a reference zone relative to the white reference.

2. A method according to claim 1, wherein the step of printing the colorimetric scales on said web of material is performed in such manner that the individual tones in each zone decrease in density in the direction of web movement.

3. A method according to claim 1, wherein said multi-colored matter appears on said web in the form of printed pages, pairs of pages being printed side-by-side to define a gap therebetween and wherein the step of printing the colorimetric scales on said web is performed in such manner that said scales are located in said gap.

4. A method according to claim 1, wherein said multi-colored matter appears on said web in the form of printed pages, pairs of pages being printed side-by-side to define gaps between an edge of each page and an adjacent edge of said web and wherein the step of printing the colorimetric scales on said web is performed in such manner that said scales are located in said gaps.

5. A method according to claim 3, wherein said scales are so printed in said gap that the length of each said scale is less than that of a printed page measured in the direction of web travel.

6. A method according to claim 4, wherein said scales are so printed in said gap that the length of each said scale is less than that of a printed page measured in the direction of web travel.

7. A method according to claim 1, in which the synchronizing marks are so printed that the ratio of the length of each synchronizing mark as measured in the direction of web movement to the length measured in the same direction of each tone of each zone is equal to or less than the ratio of the minimum and maximum speeds of the web.

8. A method according to claim 1, including storing the color density value of each tone in corresponding zones in a plurality of scales and producing from said store values a mean value for the color density.

9. A method according to claim 8, including repeating the storing and production of the mean value for each of the tones in corresponding different zones in said plurality of scales.

* * * * *